United States Patent [19]

Grosseau

[11] 4,054,181
[45] Oct. 18, 1977

[54] TRANSMISSION MECHANISM FOR AUTOMOBILE VEHICLE

[75] Inventor: Albert Grosseau, Chaville, France

[73] Assignee: Societe Anonyme Automobiles CITROEN, Paris, France

[21] Appl. No.: 647,603

[22] Filed: Jan. 8, 1976

[30] Foreign Application Priority Data

Jan. 15, 1975 France .................. 75.01152

[51] Int. Cl.² .................. B60K 17/06
[52] U.S. Cl. .................. 180/77 R; 74/473 R; 180/70 R; 192/4 A
[58] Field of Search .................. 192/3.34, 4 A; 74/470, 74/473 R, 475, 860, 866; 180/70, 77 R; 200/61.91

[56] References Cited

U.S. PATENT DOCUMENTS

| 2,342,985 | 2/1944 | Tyken | 192/4 A X |
| 2,726,556 | 12/1955 | Greenlee | 192/4 A X |
| 2,745,526 | 5/1956 | Saives | 192/4 A |
| 2,926,551 | 3/1960 | Howard | 192/4 A X |
| 3,465,612 | 9/1969 | Letwin | 74/473 R |

Primary Examiner—Joseph F. Peters, Jr.
Assistant Examiner—Terrance L. Siemens
Attorney, Agent, or Firm—Weingarten, Maxham & Schurgin

[57] ABSTRACT

This invention relates to a transmission mechanism for automobile vehicle, which comprises a drive shaft, a driven shaft, a coupling device, a reversing device, means for actuating a brake of the driven shaft and means for selecting the positions of engagement of the reversing device, the actuating means being constituted by a hydraulic circuit in which is disposed an electro-valve whose excitation circuit comprises a switch which is normally open and a switch which is normally closed, means for closing said first switch and means for opening said second switch being provided respectively between them and the selection means. The invention finds advantageous application in the field of the automobile.

10 Claims, 5 Drawing Figures

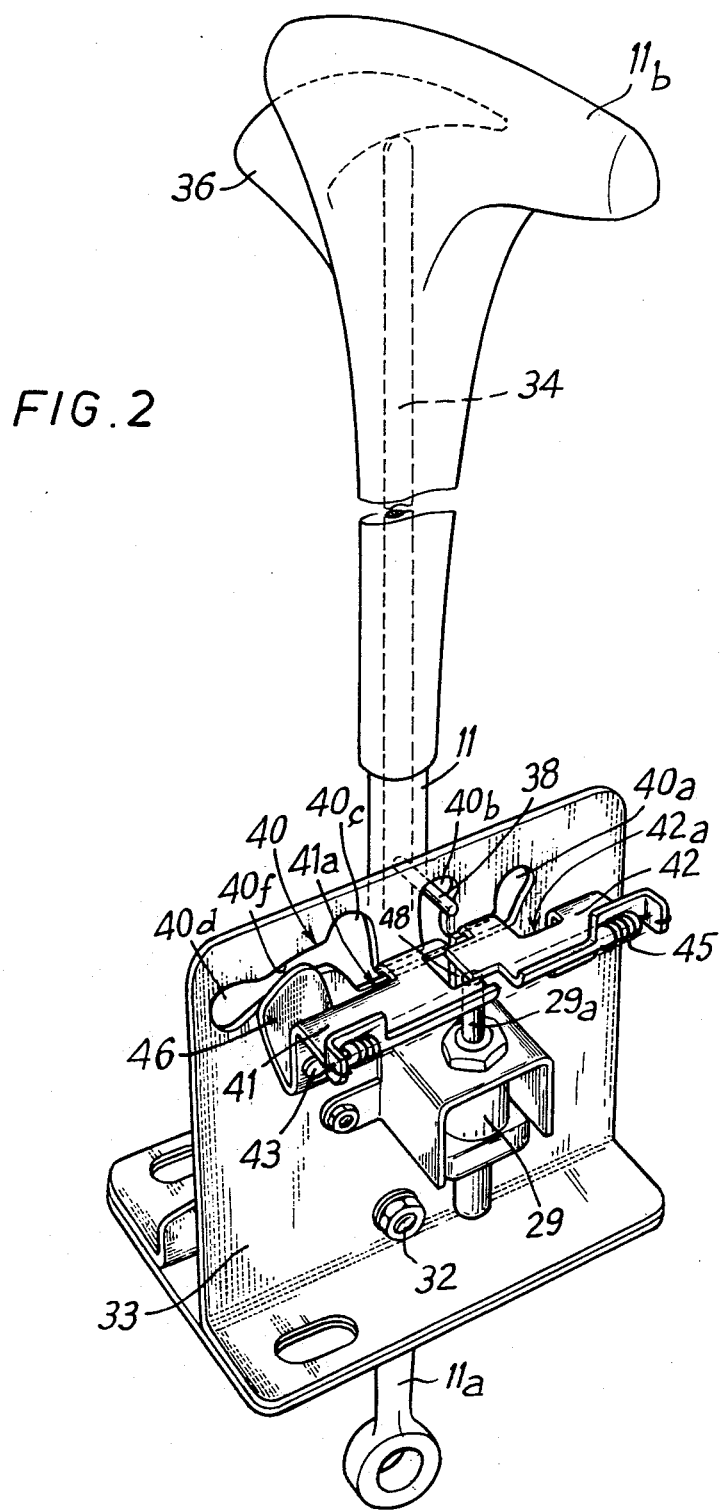

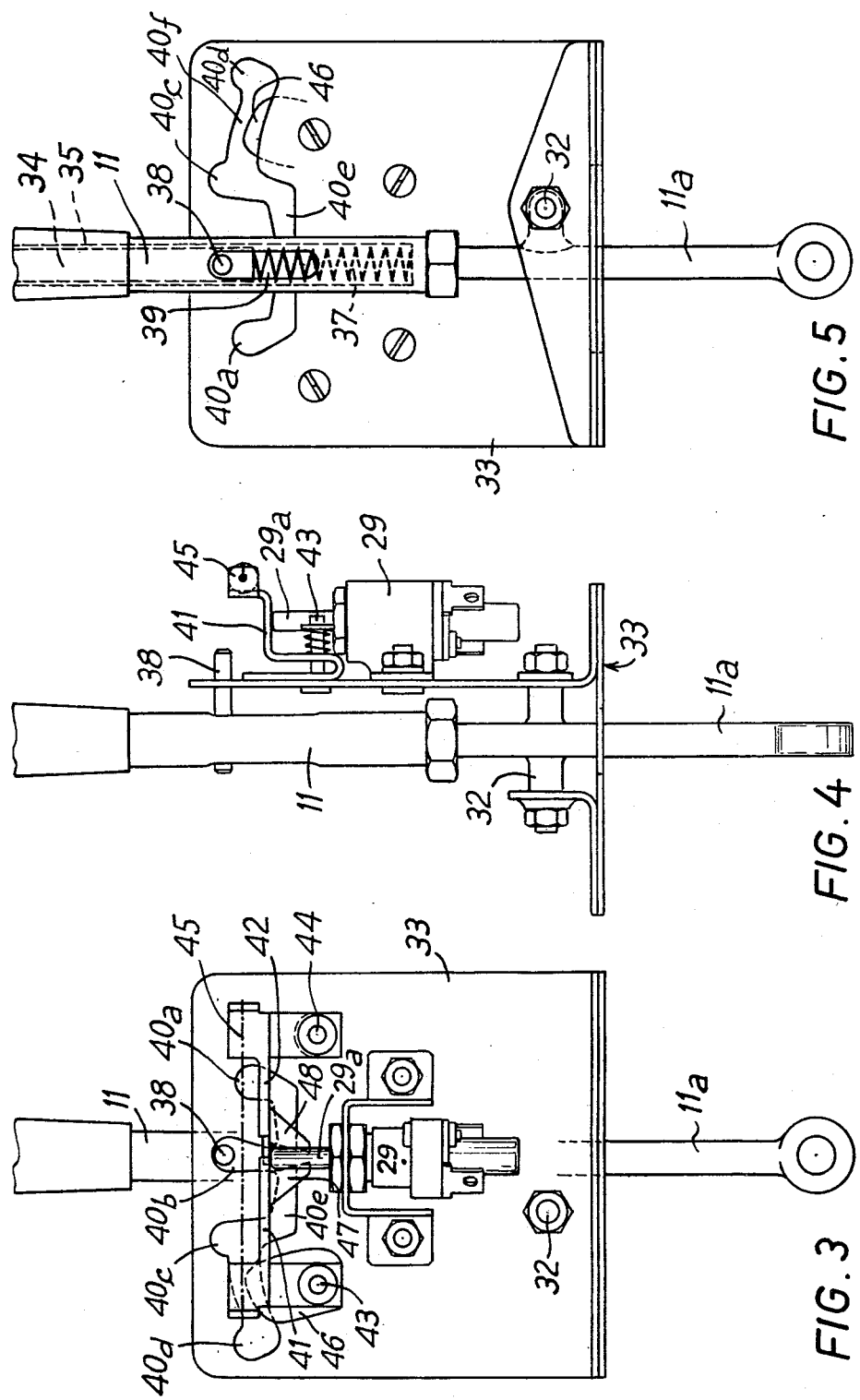

TRANSMISSION MECHANISM FOR AUTOMOBILE VEHICLE

The present invention relates to a transmission mechanism for automobile vehicle, comprising a device for coupling a drive shaft and a driven shaft equipped with a gear change device and a device for reversing the direction of motion, and a device for braking the driven shaft combined with the control of the reversing device.

In known transmission mechanisms comprising in particular hydraulic coupling devices, such as torque converters, magnetic or even centrifugal ones, there is noted a transmission of movement of the input shaft towards the output shaft of said devices when the coupling is supposed not to be controlled, as a result of friction inside these devices. The residual rotation which is ascertained is transmitted to the output shaft of the speed variation device and therefore to the input shaft of the reversing device when said latter is at neutral. This rotation constitutes an obstacle to the engagement from neutral of one or other of the directions of motion of the reversing device which is a toothed mechanism. It is therefore necessary to immobilise the input shaft of this reversing device to permit good functioning thereof.

Means for braking this shaft already exist, which are controlled upon a manoeuvre of the device for manually selecting the states of the reversing device. The arrangement of these means is such that, for any change of state of the reversing device, there is braking of the shaft. Now, the immobilisation of this shaft is necessary only in the case of a manoeuvre which leads to the engagement of a direction of motion. In fact, two devices with dogs may be disconnected without inconvenience whilst they are rotating.

It is an object of the invention to propose a device which enables the input shaft of the reversing device to be immobilised, this presenting the advantage of protecting against wear and tear of the means braking said shaft. In addition, it advantageously enables this braking to be momentarily eliminated if the engagement of one of the reversing device were rendered impossible in view of a poor presentation of the teeth with respect to one another, opposing the desired coupling of the devices which carry them.

To this end, the present invention relates to a transmission mechanism for automobile vehicle, comprising a drive shaft, a driven shaft equipped with a gear change device, an output shaft coupled to the wheels, a coupling device connecting the drive shaft and the driven shaft, a device for reversing the direction of motion connecting the driven shaft to the output shaft, means for actuating a brake of the driven shaft and means for manually selecting the positions of engagement "Forward motion" or "Reverse motion" and the positions "Neutral" and "Parking brake" of the reversing device, constituted by a linkage comprising a lever for manually controlling the said positions.

According to the invention, said actuating means are constituted by a circuit feeding the brake with pressurised fluid, in which is disposed an electrovalve normally interrupting said circuit when it is not excited and of which the electrical excitation circuit comprises a first switch which is normally open and a first member for closing said first switch that may be actuated by said lever when it is manoeuvred in the sense of establishing a connection at the reversing device between said driven and output shafts; said linkage comprises an elastic device that may be compressed when the manoeuvring effort applied to the said lever reaches a predetermined value.

In addition, the electrical excitation circuit of the electrovalve comprises, in series with the first switch, a second switch which is normally closed, whilst a member for opening said second switch is controlled by said elastic device when the manoeuvring effort applied to said lever reaches the said predetermined value.

The invention will be more readily understood on reading the following description with reference to the accompanying drawings, in which:

FIGS. 2 to 5 are detailed views of a preferred embodiment of the control lever of this mechanism.

Figure 1:
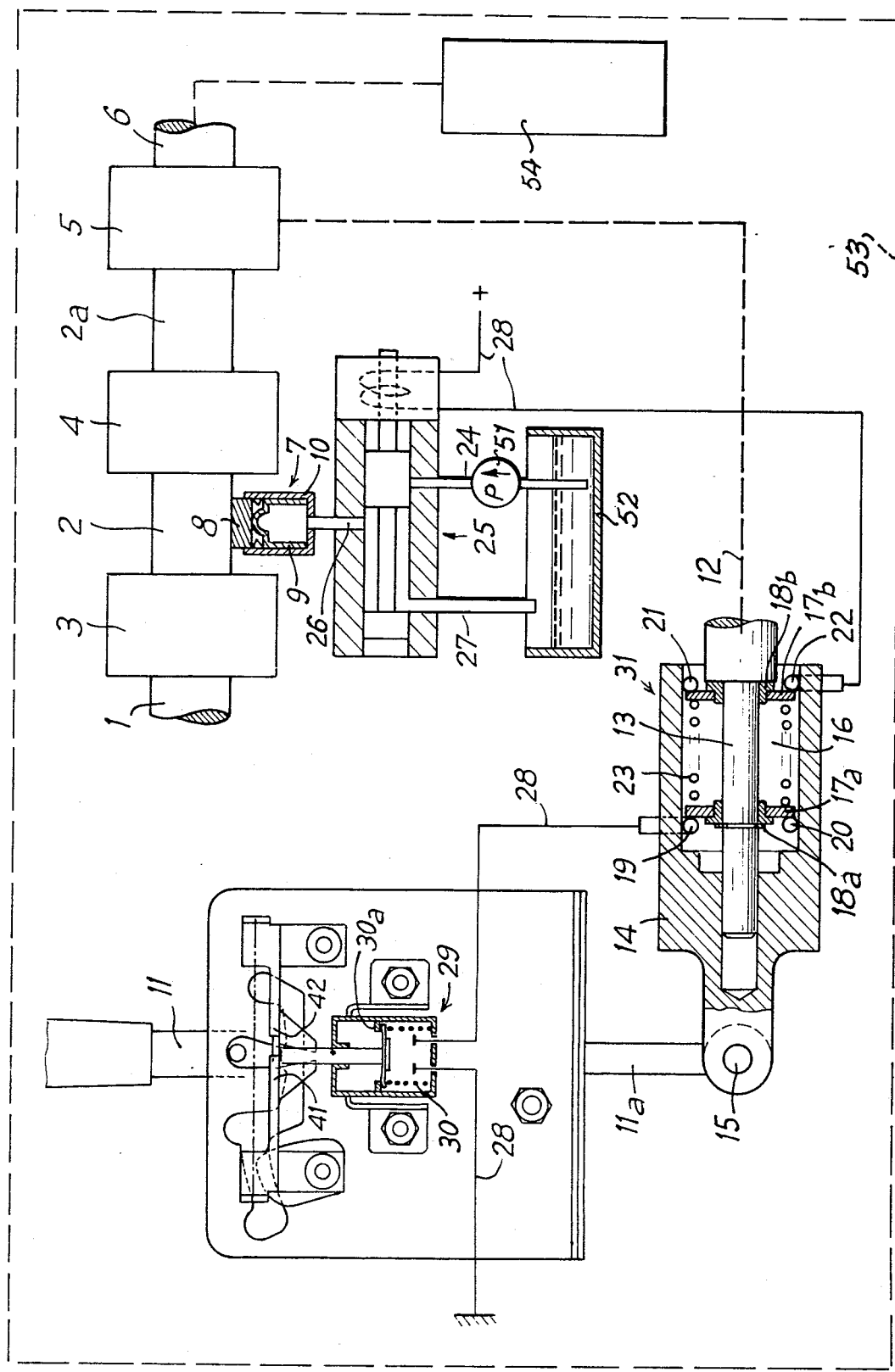
FIG. 1 is a schematic diagram of the mechanism according to the invention.

Referring now to the drawings, FIG. 1 shows a drive shaft 1 and a driven shaft 2 between which a coupling device 3 is interposed. This device 3 is of the hydraulic torque converter or coupler type. The driven shaft 2 is equipped with a gear changing device 4, for example, a variable transmission. The output shaft 2a of the variable transmission 4 is connected to the input of a device 5 for reversing the direction of motion of the vehicle and possesses an output shaft 6. Means for braking the shaft 2 are shown schematically at 7 and comprise a shoe 8 that may be maintained in contact with the shaft 2 under the thrust of a piston 9 mounted to slide in a chamber 10 that may be fed with a pressurised fluid. The control of the reversing device 5 is ensured by a selection device comprising a first manually controlled lever 11 and a linkage 12 coupled to this lever and of which the end of a rod 13 at the level of this coupling has been shown.

The means included in the constitution of this coupling are constituted by a cylindrical sleeve 14 articulated about the axis 15 at the end 11a of the lever 11. This sleeve 14 has an internal cavity 16 in which is housed the end of said rod 13. The axial connection of the sleeve with said rod is effected by means of two annular members 17a and 17b maintained in abutment with the aid of a calibrated spring 23 extended therebetween on the one hand on two shoulders 18a and 18b carried by the rod 13 and being opposite each other and, on the other hand, on two pairs of spindles 19, 20 and 21, 22 carried by the sleeve and projecting inside the cavity 16. The distance separating the planes of abutment of said annular members on the rod must be at least equal to the distance separating the planes of abutment of said members on the sleeve.

The means for actuating the brake 7 are constituted by a pressurized fluid circuit comprising a feed or input conduit 24 connected to a source of pressure such as pump 51 in which circuit is disposed an electrovalve 25 capable of establishing a communication in a first position between the conduit 24 and a conduit 26 opening into the chamber 10 and in a second position between said conduit 26 and an exhaust conduit 27 connected to a tank 52 whilst interrupting the conduit 24. Said first position corresponds to an excited state of the valve whilst the second position is its position of rest.

The electrical excitation circuit of the electrovalve 25 is shown at 28 and comprises a first switch 29 normally held open under the effect of an elastic return member 30 and a second switch 31 normally held closed. This second switch 31 is in fact constituted by the spindle 19 electrically connected to the circuit 28, the member 17a, spring 23, member 17b and spindle 22 also connected to line 28. It will be noted here that the spindles 19 to 22, members 17a and 17b and spring 23 are insulated from the sleeve 14 and the rod 13. The electrical continuity between the above-mentioned elements is ensured in the state of rest of the device by the action of the spring 23 which, in this state, applies the members 17a and 17b firstly on the spindles 19 to 22 taking into account the conditions of separation of the supports mentioned hereinabove.

FIGS. 2 to 5 show detailed views of the means cooperating with lever 11 to ensure selection of the reversing device 5 as well as the means controlling via this lever, the closure of said first switch 29. The lever 11 is thus shown to be articulated about a shaft 32 borne by a support 33. It carries at its end opposite the end 11a, a manoeuvring handle 11b. It also comprises an inner rod 34 sliding along a housing 35 under the effect of a manoeuvring spring catch 36 and against an elastic return member 37.

Said rod 34 is equipped, near its end opposite the spring catch 36, with a lateral locking pin 38 extending out of the lever 11 through an opening 39.

The support 33 is shaped so as to present, opposite the said pin 38, an aperture 40 which preferably has four notches 40a, 40b, 40c and 40d for holding the lever 11 in distinct angular positions corresponding to "Front motion", "Reverse motion", "Neutral" and "Parking brake", respectively, of the reversing device 5. The notches 40a to 40c are connected together by a connecting zone 40e and notch 40d is connected to notch 40c by a connecting zone 40f. Said aperture is passed through by pin 38 and constitutes a guide for this pin whilst the lever 11 pivots about axis 32.

The said switch 29 is fixed to said support 33 so that its push button 29a faces the pin 38. Two small plates 41 and 42 are articulated at 43 and 44 on the support 33 and are held by their adjacent ends in abutment on the end of the push button 29a by means of a return spring 45 coupled therebetween. These small plates extend perpendicularly to the support 33 at a level located between the notches 40a to to 40c and the zone 40e connecting them. Near the notch 40b corresponding to the position "Neutral" of the lever 11, they have solid parts which may come into contact with the pin 38 during its movements out of or towards said notch. Opposite the notches 40a and 40c, they present recesses 41a and 42a so that the pin 38 leaving these notches in the direction of connecting zone 40e does not come into contact with one of them.

In addition, the small plate 41 is shaped near its articulation 43 as a secondary lever 46 which is fast therewith, extending in part in the said zone 40f and capable of pivoting about the axis 43 when the pin 38 passes into this zone.

It is obvious that the above-mentioned aperture 40 may be of different shape from the one shown in the drawings. The notch 40d corresponding to the position "Parking brake" may thus be located on the side of the notch 40a for "Forward motion". The secondary lever 46 would then be coupled to the small plate 42 so as to cover the connecting zone extending in this case between said notch 40a and the new notch 40d placed near the notch 40a which would correspond to the zone 40f of the Figures.

Furthermore, it is known that at the level of the reversing device 5, the control linkage 12 is locked by means of a known device in all the positions corresponding to "Forward motion", "Reverse motion", "Neutral" and "Parking brake" of the device 5. The locking by the cooperation of the pin 38 with the aperture 40 therefore improves reliability of this lock. Nevertheless, this extra reliability may be eliminated without detriment to the good operation of the device, this leading to another variant in shape (not shown) of the aperture 40 which would then present only the notch 40b corresponding to neutral and a substantially horizontal connecting zone of which parts 40e and 40f would be in line with each other and sufficiently long to allow a correct range of movement of the lever 11; the end of the lever 46 would extend in part 40f. The small plates 41 and 42 would still extend above this zone 40e, 40f and would present recesses 41a and 42a since the pin 38 would always be located under the small plates in positions of the lever other than those corresponding to neutral.

Finally, particularly with regard to FIG. 3, it will be noted that said plates 41 and 42 have tongues 47 and 48 extending in a plane parallel to the plane of the aperture 40 against the support 33 in extension of the edges of the notch 40b. These small plates 41, 42, as will be seen when the functioning of the invention is set forth, constitute the member closing the first switch 29. A variant embodiment (not shown) of this closure member consists in a single plate such as 41 extending so as completely to obstruct the notch 40b at its connection with the zone 40e and maintained in abutment on the push-button 29a by a spring such as 45 coupled then between it and the support 33.

To explain the functioning of the mechanism of the invention, it will be assumed that the reversing device 5 is in its neutral position, this corresponding to such a position of the lever 11 that the pin 38 is in notch 40b.

Under the effect of the spring 37, the pin 38 is held at the bottom of the notch 40b. In addition, under the effect of the spring 30 of the switch 29, the push button 29a comes into abutment against the stop 30a whilst the plates 41 and 42 rest on the push button 29a due to the spring 45. The switch 29 is therefore open and, although the switch 31 is closed, the electro-valve 25 is in the rest position since it is not excited and the braking means 7 are connected to exhaust.

The driver of the vehicle having decided to engage a forward gear, actuates the spring catch 36 to make pin 38 pass into notch 40a corresponding to forward motion. The pin 38 therefore enters into notch 40b until it comes into contact with plates 41 and 42. The continuing descent of the pin to reach zone 40e causes the plates to pivot about their axes 43 and 44 resulting in the push-button 29a being pushed in, compressing the spring 30. The switch is at this moment closed and the electro-valve excited. It establishes a communication between the conduit 24 and conduit 26, the shoe 8 then being applied energetically on the shaft 2. It will be noted on this subject that the braking means 7 may be disposed on any member coupled to rotate with the shaft 2 or shaft 2a. One advantageous embodiment consists in disposing the means 7 opposite the primary rotor bowl included in the constitution of the gear-change device. The rotation of all the device located at the outlet of the coupling device 3 is thus stopped. The pin 38 having reached zone 40e may pass through it in the direction of notch 40a. In this movement, it slides on the top of the plate 42 and maintains the switch 29 closed for the duration of the pivoting of the lever 11. The driver then releases the spring catch 36 and the pin 38 is housed at the bottom of the notch 40a. The plates which are not longer subjected to the action of the pin 38, take back their initial position under the effect of the return spring 30 of the push-button 29a, the switch 29 opening again.

The pivoting of the lever 11 brings about the translation of sleeve 14 to the left of FIG. 1. Two cases may then arise. In a first assumption, the immobilisation of the transmission shafts is such that, at the reversing device 5, the positions of the mobile elements constituting it, allow the engagement of forward gear, particularly by engagement of a sliding pinion with the forward motion pinion. In this case, there is no resistant effort at the level of the linkage 12 and the sleeve 14 drives the rod 13 by means of spindles 21 and 22 of the member 17b of the spring 23 and of the member 17a.

If, on the other hand, the said immobilisation corresponds to positions of the mobile elements of the reversing device such that there is no engagement of forward motion—the dogs are located opposite one another—the linkage 12 can thus move only the rod 13 which is fast therewith. As the manoeuvring effort of the lever 11 is greater than the resistant effort offered by the calibrated spring 23 against the displacement of the sleeve 14 with respect to the rod 13, said sleeve moves with respect to the rod by driving the member 17b by the spindles 21 and 22 and by compressing the spring against the member 17a maintained fixed on the shoulder 18a carried by the rod. The spindles 19 and 20 fast with the sleeve have therefore moved with respect to the member 17a. The electrical continuity existing between the spindle 19 and the spindle 22 is broken at this level. The electrovalve 25 is therefore no longer excited and returns to its rest position. The chamber 10 is then placed in communication with the exhaust conduit 27. The shoe 8 is therefore no longer applied to the shaft 2 and this latter may rotate, bringing about a sufficient rotation of the input of the reversing device 5 enabling said positions to be changed. This rotation very quickly leads to a position allowing the engagement of forward motion. As the linkage 12 is subjected to the action of the compressed spring 23 thus located in a reinforced position, this engagement is produced at the first occasion met with.

To return to neutral, the driver again presses on the spring catch 36. The locking pin 38 thus passes into the zone 40e of the aperture 40 and under the plate 42 via the recess 42a opposite the notch 40a. By moving the lever to the left, the pin passes through a part of the zone 40e, lifting the plate 42 by friction on the outer sloping edge of the tongue 48, until it abuts on the inner edge of the tongue 47 thus immobilising the lever plumb with the notch 40b. With the release of the spring catch 36, the pin rises to the further end of the said notch 40b, lifting the plates 41 and 42 which are returned to their position by spring 45.

This operation corresponds to a throwing out of gear which does not necessitate immobilisation of the input of the reversing device 5. By the form of the plates, particularly of the recess 42a, the movement of the pin has not given rise to a closure of the switch 29. The brake has therefore not been actuated.

The passage from neutral to reverse and the return to neutral produces the same effects as those described hereinabove, the plate 41 being between the notch 40c for reverse motion and notch 40b, with characteristics similar to those of the plate 41. Similarly, the functional characteristics of the switch-coupling device 31 are symmetrical for the two directions of pivoting of the lever.

To arrive at the "parking brake" position, the driver must firstly pass into reverse motion position then, by maintaining a slight pressure on the spring catch 36, disengage the pin 38 from the notch 40c so that it may be engaged upon pivoting of the lever 11 in the zone 40f of the aperture 40. In its passage in the direction of notch 40d, the pin causes the secondary lever 46 to pivot about the axis 43. The plate 41, fast with the lever 46, rises and the whole is returned into its initial position by the spring 45 after passage of the pin 38. Here, there is no closure of the contact 29, the operation corresponding to a throwing out of gear.

To return from "Parking brake" position to the "Neutral position," one must pass through "Reverse motion" position, this corresponding to an engagement of gear. The driver disengaging the pin 38 from notch 40d by action on the spring catch 36, displaces this pin in zone 40f of the aperture 40 by pivoting of the lever 11. The passage of the pin on the lever 46 produces a pivoting of this latter, thus of the plate 41 in the sense of pressing in of the push-button 29a. The switch 29 is thus closed and the brake 7 fed with pressurised fluid. Following the instant of immobilisation, one or other of the cases described may be met with upon passage from forward motion.

The main advantages of the invention reside in the fact that it ensures the immobilisation of a transmission subjected to a residual rotation in the cases strictly necessary for the good functioning of this transmission. The braking being reduced as much as possible, the life of the members included in the constitution of a brake such as 7 is lengthened.

In addition, it should be noted that the lever 11 equipped in this manner with its locking pin necessitates two actions to select a state of the reversing device: an unlocking and a pivoting. This disposition, association in particular with the tongues 47 and 48 with which the plates 41 and 42 are provided, advantageously increases the reliability of such a mechanism.

Finally, the manoeuvres of engagement are simplified when there is refusal of engagement. In fact, there is no longer any need to start this manoeuvre again in view of the automatic working of the arrangement of the members which must be engaged due to the switch—elastic coupling device 31.

The invention advantageously finds application in the field of automobile construction, wherein the automobile is represented schematically in FIG. 1 by the dotted enclosure 53 having wheels depicted schematically by block 54 coupled to output shaft 6.

What is claimed is:

1. A transmission mechanism for automobile vehicle, comprising a drive shaft, a driven shaft equipped with a gear change device, an output shaft coupled to the wheels, a coupling device connecting the drive shaft and the driven shaft, a device for reversing the direction of motion connecting the driven shaft to the output shaft, means for actuating a brake of the driven shaft and means for manually selecting the positions of engagement "Forward motion" or "Reverse motion" and positions "Neutral" and "Parking brake" of the reversing device constituted by a linkage comprising a lever for manually controlling the said positions, wherein the said actuating means are constituted by a circuit feeding the brake with pressurised fluid in which is disposed an electrovalve normally interrupting said circuit when it is not excited and of which the electrical excitation circuit comprises a first switch that may be actuated by said lever when it is manoeuvred in the sense of establishing a connection at the reversing device between the said driven and output shafts and wherein said linkage comprises an elastic device that may be compressed when the manoeuvring effort applied to the said lever reaches a predetermined value.

2. A transmission mechanism as claimed in claim 1, wherein said lever is mounted to pivot on a support and is equipped laterally with a pin that may be actuated manually along the lever, from a rest position against an elastic return member, said support having an aperture for guiding the pin, which passes therethrough, upon the angular displacements of the lever, said aperture comprising four notches for maintaining said lever in distinct angular positions corresponding respectively to the said positions of the reversing device and a zone connecting said notches together for passage of the pin upon a pivoting of the lever, said first switch is carried by said support and has a push-button facing said pin and maintained elastically in its position of opening of the first switch and the member closing the first switch is constituted by at least one small plate articulated by one of its ends to said support and maintained in contact with the push-button by a return spring coupled between it and the support, said plate extending in a plane perpendicular to the support and near the aperture so as to constitute a lever actuating the push-button on passage of the pin out of the notch corresponding to the position "Neutral" of the lever and retractable on passage of the pin in the direction of this notch.

3. A mechanism as claimed in claim 2, wherein said small plate is fast, near its articulated end, with a secondary lever for actuating the push-button, the end of which covers a part of the connecting zone of the said aperture connecting the notch corresponding to one of said positions of engagement to the one corresponding to the position "Parking brake" and which pivots about the said articulation on passage of the said pin in this zone.

4. A mechanism as claimed in claim 3, wherein the said end of said secondary lever is shaped as a ramp cooperating with the said pin so that the plate on the one hand retracts on passage of the pin in the direction of the "Parking brake" notch and on the other hand pivots in the sense of actuating the said push-button on passage of the pin in the opposite direction.

5. A mechanism as claimed in claim 2, wherein the said plate has a recess opposite each of the notches corresponding to a position of engagement of the reversing device, said recess constituting a slot for passage of the pin on either side of the plate.

6. A mechanism as claimed in claim 2, wherein the said plate is in contact with the push-button by its end opposite the articulation and a secondary plate is disposed symmetrically to said plate with respect to the push-button, the return spring then being coupled between them.

7. A mechanism as claimed in claim 6, wherein, near the said aperture each of said plates extends to substantially the centre of the "Neutral" notch.

8. A mechanism as claimed in claim 1, wherein the said elastic device is coupled between the end of a rod of said linkage and said lever and is constituted by a cylindrical sleeve articulated to said lever and in the inner recess of which is housed the end of said rod, the axial connection between the sleeve and the rod being made by two annular members maintained, by means of a calibrated spring extending therebetween, in abutment on the one hand on two shoulders carried face to face by the rod and on the other hand on two pairs of spindles carried by the sleeve and projecting into the said cavity in radial planes separated by a distance equal to the one separating the two shoulders.

9. A mechanism as claimed in claim 8, wherein the electrical excitation circuit of the electrovalve comprises, in series with the first switch, a second switch which is normally closed and wherein a member for opening the second switch is controlled by said elastic device when the manoeuvring effort applied to said lever reaches the said predetermined value.

10. A mechanism as claimed in claim 9, wherein the second switch is constituted by at least one spindle of each of the said pairs by the two said annular members and by the spring, each of these elements being electrically insulated from the rod and the sleeve, said spring constituting the member opening this switch when the effort exerted on the sleeve by the lever exceeds the value of the calibration.

* * * * *